(12) United States Patent  (10) Patent No.: US 8,804,792 B1
Cheung et al.  (45) Date of Patent: Aug. 12, 2014

(54) INTERMEDIARY SIGNAL CONDITIONING DEVICE WITH INTERRUPTIBLE DETECTION MODE

(71) Applicant: Pericom Semiconductor, San Jose, CA (US)

(72) Inventors: Hung-Yan Cheung, Hong Kong (HK); Michael Yimin Zhang, Palo Alto, CA (US)

(73) Assignee: Pericom Semiconductor Corporation, Milpitas, CA (US)

(*) Notice: Subject to any disclaimer, the term of this patent is extended or adjusted under 35 U.S.C. 154(b) by 0 days.

(21) Appl. No.: 13/766,647

(22) Filed: Feb. 13, 2013

Related U.S. Application Data (60) Provisional application No. 61/602,985, filed on Feb. 24, 2012.

(51) Int. Cl.
    *H04L 25/00* (2006.01)

(52) U.S. Cl.
    USPC .............................. 375/214; 375/354; 710/48

(58) Field of Classification Search
    USPC ......... 375/211, 214, 216, 219, 244, 257, 259, 375/354; 710/14, 18, 31, 36, 48, 65; 348/14.01, 14.02; 455/4, 9, 14
    See application file for complete search history.

(56) References Cited

U.S. PATENT DOCUMENTS

| | | |
|---|---|---|
| 6,452,402 B1 | 9/2002 | Kerai |
| 6,614,206 B1 | 9/2003 | Wong |
| D484,094 S | 12/2003 | Xiao |
| 6,798,173 B2 | 9/2004 | Hsu |
| 6,936,936 B2 | 8/2005 | Fischer |
| 6,946,817 B2 | 9/2005 | Fischer |
| 6,980,204 B1 | 12/2005 | Hawkins |
| 7,017,055 B1 | 3/2006 | Ho |
| 7,170,259 B2 | 1/2007 | Veselic |
| 7,239,111 B2 | 7/2007 | Fischer |
| 7,291,041 B1 | 11/2007 | Yang |
| 7,313,423 B2 * | 12/2007 | Griffin et al. .............. 455/575.2 |
| 7,338,328 B2 | 3/2008 | Krieger |
| 7,358,703 B2 | 4/2008 | Veselic |
| 7,376,846 B2 | 5/2008 | Hawkins |
| 7,426,126 B1 | 9/2008 | Lai |
| 7,453,233 B2 | 11/2008 | Fischer |
| 8,059,727 B2 * | 11/2011 | Proctor et al. ................ 375/260 |
| 8,237,414 B1 | 8/2012 | Li |
| 2004/0005009 A1 * | 1/2004 | Taghizadeh-Kaschani .. 375/259 |
| 2004/0246341 A1 | 12/2004 | Lee |
| 2005/0114570 A1 | 5/2005 | Chang |

(Continued)

OTHER PUBLICATIONS

U.S. Appl. No. 13/540,515, "Multi-Mode Charger Device", filed Jul. 2, 2012.

*Primary Examiner* — Dac Ha
(74) *Attorney, Agent, or Firm* — The Webostad Firm (57) ABSTRACT

Disclosed are embodiments for an intermediary signal conditioning device with an input adaptable detection mode. In one embodiment, an intermediary signal conditioning device has a control module, an input module, and an output module. The input module and the control module are for receiving an input signal. The control module is configured to interrupt the output module within a duration of time to allow at least a minimum pulse length of the input signal to be output as an output signal from the output module. The intermediary signal conditioning device is configured to condition the input signal for retransmission as the output signal.

20 Claims, 7 Drawing Sheets

(56) References Cited

U.S. PATENT DOCUMENTS

| | | |
|---|---|---|
| 2005/0174091 A1 | 8/2005 | Dayan |
| 2006/0033474 A1 | 2/2006 | Shum |
| 2006/0170393 A1 | 8/2006 | Yang |
| 2006/0181241 A1 | 8/2006 | Veselic |
| 2007/0005840 A1 | 1/2007 | Cheng |
| 2007/0024239 A1 | 2/2007 | Park |
| 2007/0088967 A1 | 4/2007 | Fu |
| 2008/0042616 A1 | 2/2008 | Monks |
| 2008/0278002 A1 | 11/2008 | Platania |
| 2008/0303486 A1 | 12/2008 | Kao |
| 2012/0322366 A1 * | 12/2012 | Davies ........................... 455/18 |

* cited by examiner

INTERMEDIARY SIGNAL CONDITIONING DEVICE WITH INTERRUPTIBLE DETECTION MODE

CROSS-REFERENCE TO RELATED APPLICATION(S)

This application claims benefit of priority to U.S. provisional patent application No. 61/602,985, filed Feb. 24, 2012, which is incorporated herein by reference in its entirety for all purposes.

FIELD

One or more embodiments generally relate to integrated circuit devices ("ICs"). More particularly, one or more embodiments relate generally to an intermediary signal conditioning device or a signal integrity device.

BACKGROUND

High-speed serial data driven between a transmitter and a receiver can deteriorate or suffer signal losses over distance or time. Such losses or deterioration may be conditioned by an intermediary signal conditioning device or a signal integrity device. Such intermediary signal conditioning devices or signal integrity devices are sometimes called repeaters, buffers, re-drivers, and other names.

Accordingly, it would be desirable and useful to provide an intermediary signal conditioning device which can provide signal integrity and maintain data transmission in high speed applications.

BRIEF SUMMARY

One or more aspects generally relate to an intermediary signal conditioning device with an input adaptive detection mode.

An embodiment relates generally to an apparatus. In such embodiment, an intermediary signal conditioning device has a control module, an input module, and an output module. The input module and the control module are for receiving an input signal. The control module is configured to interrupt the output module within a duration of time to allow at least a minimum pulse length of the input signal to be output as an output signal from the output module. The intermediary signal conditioning device is configured to condition the input signal for retransmission as the output signal.

Another embodiment relates generally to another apparatus. In such embodiment, an intermediary signal conditioning device has a control module, an input module, and an output module. The input module and the control module are for receiving an input signal. The control module is configured to interrupt a detection mode of the intermediary signal conditioning device within a duration of time to allow at least a minimum pulse length of the input signal to be output as an output signal from the output module. The intermediary signal conditioning device is configured to condition the input signal for retransmission as the output signal.

Yet another embodiment relates generally to a method for retransmission. In such an embodiment, an intermediary signal conditioning device is operated in a detection mode. A transmitted signal is received to an input module and a control module of the intermediary signal conditioning device while in the detection mode. The intermediary signal conditioning device responds to receipt of the transmitted signal by switching from the detection mode to a retransmission mode within a duration of time sufficient to allow at least a minimum pulse length of the transmitted signal to be processed as an input signal for retransmission as an output signal. The input signal is conditioned by the intermediary signal conditioning device for retransmission. The input signal is retransmitted as an output signal via an output module of the intermediary signal conditioning device.

BRIEF DESCRIPTION OF THE DRAWING(S)

Accompanying drawing(s) show exemplary embodiment(s) in accordance with one or more aspects of the invention; however, the accompanying drawing(s) should not be taken to limit the invention to the embodiment(s) shown, but are for explanation and understanding only.

FIGS. 7-1 and 7-2 are respective signal diagrams depicting respective exemplary embodiments of a transmitted or input ("input") signal having a pulse width or pulse length or envelope length.

DETAILED DESCRIPTION

In the following description, numerous specific details are set forth to provide a more thorough description of the specific embodiments. It should be apparent, however, to one skilled in the art, that the invention may be practiced without all the specific details given below. In other instances, well-known features have not been described in detail so as not to obscure the embodiments. For ease of illustration, the same number labels are used in different diagrams to refer to the same items; however, in alternative embodiments the items may be different. Furthermore, though particular values are described herein for purposes of clarity by way of example, it should be understood that the scope of the description is not limited to these particular numerical examples as other values may be used.

In the following description, for purposes of explanation, specific nomenclature is set forth to provide a thorough understanding of the various inventive concepts disclosed herein. However, it will be apparent to one skilled in the art that these specific details are not required in order to practice the various inventive concepts disclosed herein.

Some portions of the detailed descriptions that follow are presented in terms of algorithms and symbolic representations of operations on data bits within a computer memory. These algorithmic descriptions and representations are the means used by those skilled in the data processing arts to effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

An issue may arise when a transmitter, such as a host computer device ("host") for example, sends a signal to an intermediary signal conditioning device while such intermediary signal conditioning device is in a receiver detection mode. Such signal may have a pulse length that is effectively too short to be retransmitted while the intermediary signal conditioning device is in a receiver detection mode, namely too short to survive completion of a receiver detection mode or too much signal would be lost by waiting for completion of a receiver detection mode.

Heretofore, such signal was effectively ignored by an intermediary signal conditioning device while in a receiver detection mode, which prevented transmission by a host. In other words, during a receiver detection mode such intermediary signal conditioning device would effectively block or not do anything with a host transmitted signal effectively preventing communication with a receiver. A host, encountering such an unresponsive intermediary signal conditioning device, may determine that a communication link ("link") between the host and the receiver is broken, and accordingly such host may attempt to reset the link, which may include the host sending a training signal, initiating a receiver detection mode of the host, or other protocol activities for resetting the link or "handshake."

Figure 1:
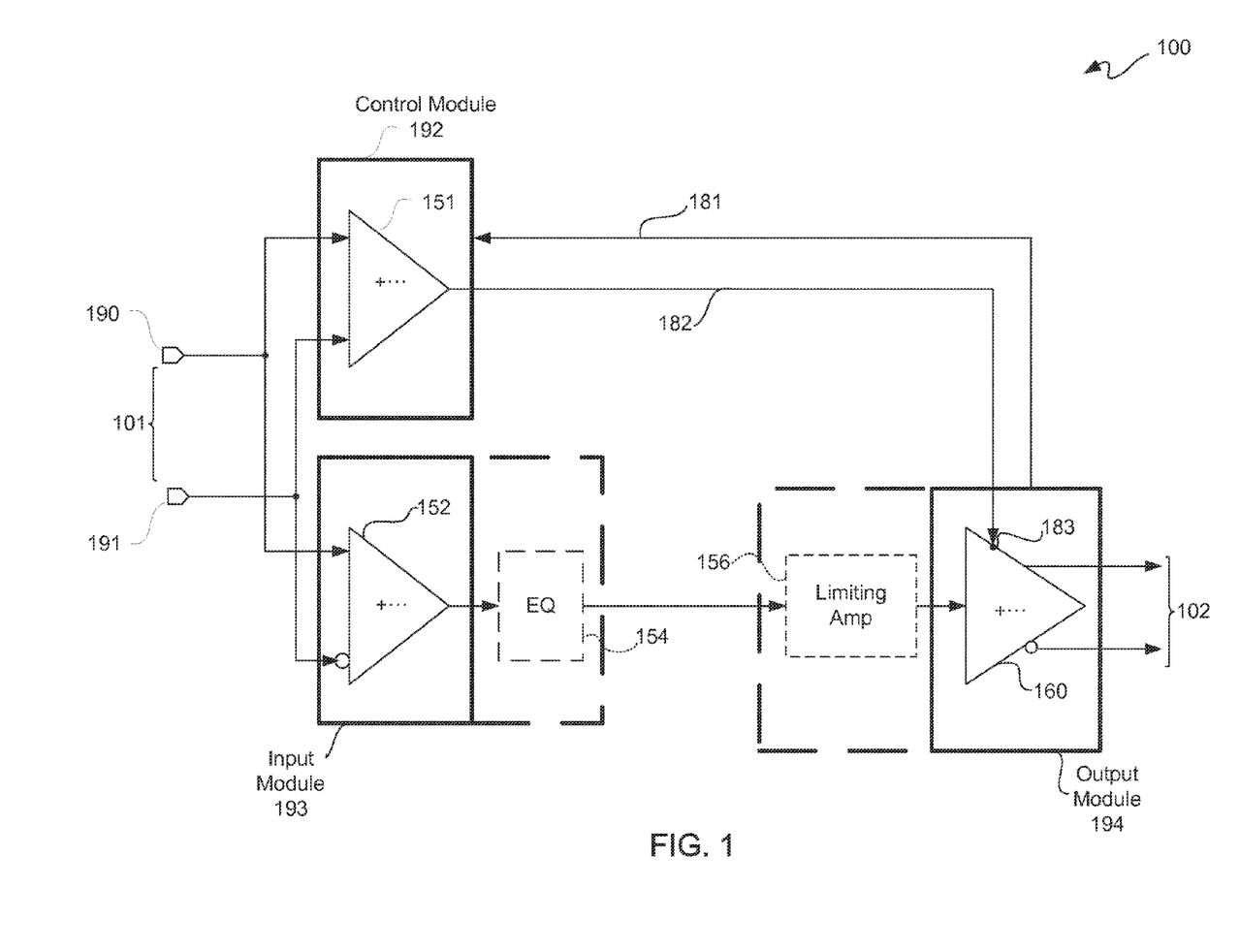
FIG. 1 is a block/circuit diagram depicting an exemplary embodiment of an intermediary signal conditioning device with an input adaptive detection mode.

FIG. 1 is a block/circuit diagram depicting an exemplary embodiment of a signal integrity or an intermediary signal conditioning device ("intermediary signal conditioning device") 100 with an input adaptable detection mode. Intermediary signal conditioning device 100 has a control module 192, an input module 193, and an output module 194. Intermediary signal conditioning device 100 may be a re-driver or a re-timer. For purposes of clarity by way of example and not limitation, it shall be assumed that intermediary signal conditioning device 100 is a re-driver.

Input module 193 and control module 192 are coupled to receive an input signal via a transmitter-side input module or interface ("input interface") 101. In this embodiment, such input signal is a differential signal having a plus port 190 and a minus port 191. More particularly, in this exemplary embodiment, input interface 101 is a differential current mode logic ("CML") input.

Control module 192 may include a differential amplifier 151, and input module 193 may include a differential amplifier 152. Input module 193 may optionally include a filter block, such as equalizer 154 for example. Differential amplifier 151 may have an input port coupled to plus port 190 and another input port coupled to minus port 191. Likewise, differential amplifier 152 may have an input port coupled to plus port 190 and another input port coupled to minus port 191. Output of differential amplifier 152 may be provided to equalizer 154, and output of equalizer 154 may be provided to a signal boosting block, such as limiting amplifier 156 for example.

Output module 194 may include a differential driver 160. Optionally, output module 194 may include a limiting amplifier 156. Output of limiting amplifier 156 may be provided as an input to differential driver 160. Output of differential driver 160 may be provided as an output signal via a receiver-side output module or interface ("output interface") 102.

Differential driver 160 includes a detection port 183. Output of differential amplifier 151 may be provided as a control signal 182 to detection port 183 to differential driver 160. Along those lines, differential amplifier 151 may act as a signal detector. Control signal 182 may be used to indicate when an input signal is received by input interface 101. Output module 194 may be configured to provide a control signal 181 to control module 192. Control signal 181 may be used to indicate when output module 194 is in a detection mode or a retransmission mode.

In a retransmission mode, intermediary signal conditioning device 100 may condition an input signal received via input interface 101 for retransmission as output signal via output interface 102. When not in a retransmission mode, intermediary signal conditioning device 100 may be in a detection mode, where such detection mode is an input adaptable detection mode as described below in further detail. Along those lines, control module 192 may be configured to interrupt output module 194 and transition from a detection mode to a retransmission mode within a short amount of time. Such short amount of time may be associated with a predetermined length of an input signal to allow loss of a portion of such input signal while still allowing a threshold amount of the remainder of such input signal to be output as an output signal from output module 194.

By interruption of a detection mode, it is generally meant that a detection mode may be suspended, halted, exited, put on hold, adjusted, or otherwise affected. Such interruption is used to allow intermediary signal conditioning device 100 to transition out of a detection mode to have an input signal, such as a transmitted signal, be retransmitted as an output signal, as described below in additional detail. Such a detection mode may be for the purpose of detecting the presence or absence of a receiver, a load, or any other electrical component coupled to output interface 102.

Some specifications may dictate a minimum pulse length of an input signal that may be used. For example, a specification may effectively state that at least 90 percent of an input signal must be made available, or, stated in other terms, at most 10 percent of an input signal state may be lost and still meet the specification threshold. This is just one example of a specification threshold level, and accordingly this or other threshold levels may be used. Accordingly, a predetermined signal length of an input signal may relate to a signal transmission or retransmission parameter of a specification. Such a specification may be related to a protocol. Examples of such protocols may include without limitation USB, PCIe, SAS, and SATA.

Along those lines, a predetermined signal length of an input signal which may be lost may be associated with or within a duration of time for intermediary signal conditioning device 100 to go from a detection mode to a retransmission mode to output such input signal as an output signal. Stated another way, a minimum pulse width that may be passed as an output may be associated with such duration of time in which a portion of such pulse width may be lost.

Such duration of time may be substantially less than a minimum pulse length of an input signal. For example, such duration of time may be less than approximately 10 percent of a minimum pulse length of an input signal. Thus, in this example, at least 90 percent of an input pulse length of an input signal may be provided for output as output signal. Along the above-described lines, an interrupt time of intermediary signal conditioning device 100 for going from a detection mode to a retransmission mode may be equal to or less than an allowable amount of loss of an output length of an input signal.

Control module 192 may be configured to interrupt output module 194 to allow a substantial portion of an input signal received during a detection mode to be retransmitted by intermediary signal conditioning device 100 as an output signal. For example, in response to receiving an input signal at input interface 101, control module 192 may be cause suspension or exiting of a detection mode by output module 194. Such a detection mode may be a receiver detection mode or a load detection mode.

Figure 2:
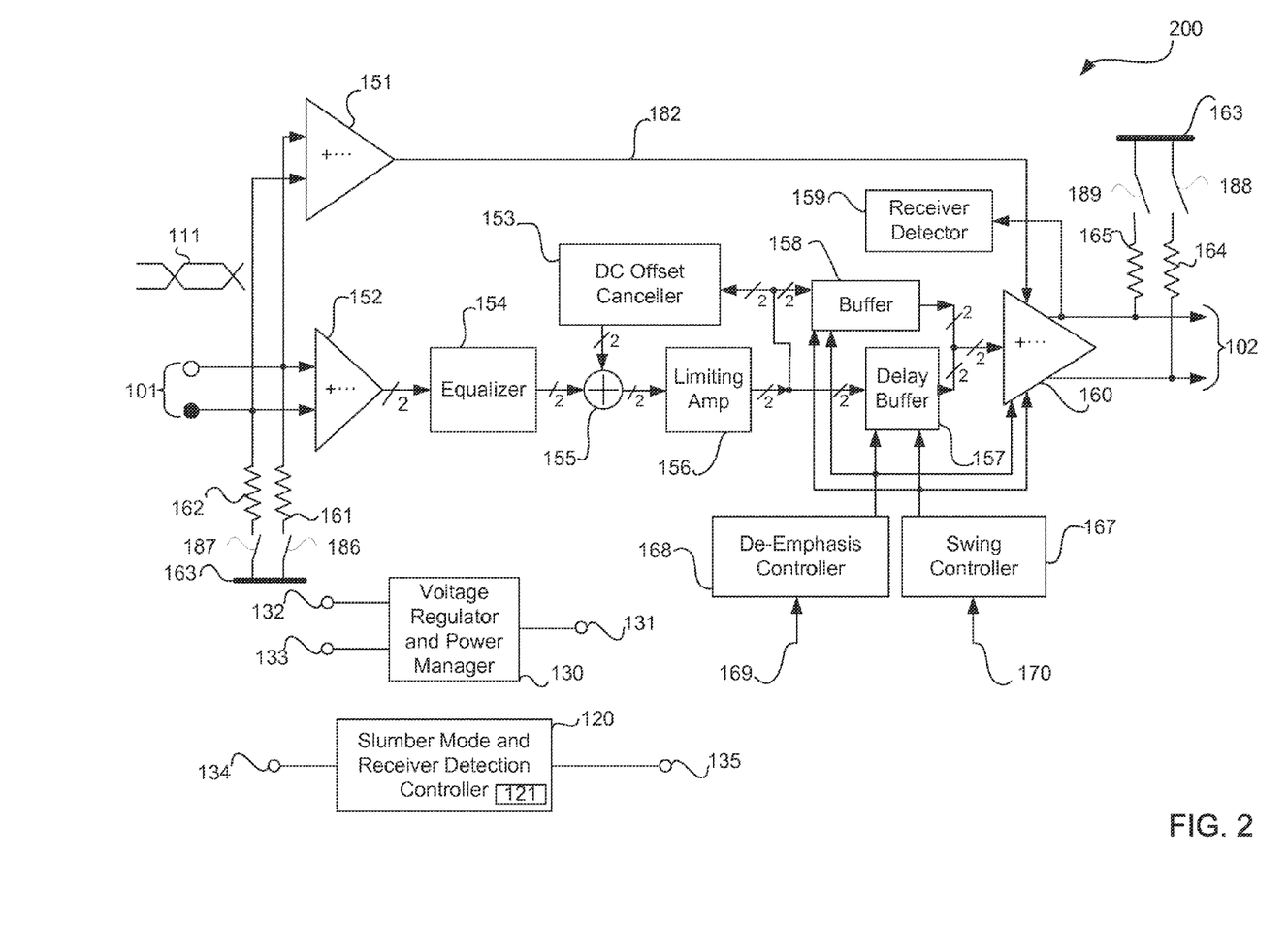
FIG. 2 is a block/circuit diagram depicting an exemplary embodiment of a re-driver conditioning device with an interruptible detection mode.

FIG. 2 is a block/circuit diagram depicting an exemplary embodiment of a re-driver conditioning device 200 with an interruptible detection mode. Re-driver conditioning device may be an embodiment of intermediary signal conditioning device 100 of FIG. 1. As some description of re-driver conditioning device 200 is the same as corresponding description of intermediary signal conditioning device 100 of FIG. 1, such same description is not repeated for clarity.

Re-driver conditioning device 200 includes input interface 101, differential amplifiers 151 and 152, equalizer 154, adder 155, DC offset canceller 153, limiting amplifier 156, de-emphasis controller 168, swing controller 170, delay buffer 157, buffer 158, differential driver 160, receiver detector 159, resistors 161, 162, 164 and 165, voltage regulator and power manager 130, slumber mode and receiver detection controller ("control circuit") 120, and output interface 102, as well as switches 186 through 189. In an embodiment, switches 186 through 189 may be digital switches implemented with transistors.

When re-driver conditioning device 200 is ready to receive transmitted signals from a transmitter, input interface 101 is in a first state, and when re-driver conditioning device 200 is not ready to receive transmitted signals from a transmitter, input interface 101 is in a second state. Again, for purposes of clarity by way of example and not limitation, re-driver conditioning device 200 supports various specifications or protocols in communications, computing, storage and other applications. For example, re-driver conditioning device 200 can be used in USB 3.0, SAS, SATA, or PCIe applications, interfaces, systems, or networks; however, re-driver conditioning device 200 may be used in any of a variety of interfaces, applications, systems, or networks, including with any of a variety of specifications in computing, networking, communications, storage, and other areas. Along those lines, input interface 101 and output interface 102 may be configured to receive and send, respectively, signals in conformance with any of a variety of protocols and/or specifications.

In a ready to receive state, input interface 101 of intermediary signal conditioning device 100 may be at 50 ohms, and in a not ready to receive state, input interface 101 of intermediary signal conditioning device 100 may in a high impedance state, namely a "Hi-Z" state. To provide such conditional input loading, an end of each of resistors 161 and 162 may respectively be coupled to a supply voltage via digital switches 186 and 187, such as Vbias 163 for example, and other ends of resistors 161 and 162 may respectively be coupled to plus and minus ports of input interface 101.

When in a ready to receive state, a transmitter, such as a USB3 interface of a host for example, may transmit a signal 111 to input interface 101. Such signal 111 may be intended for conditioning and transmission by re-driver conditioning device 200 to a receiver, such as a USB3 peripheral device ("peripheral") for example. In accordance with a computing or communication interface or protocol, signal 111 may have a minimum signal or pulse length, as previously described and described below in additional detail. The example of USB3 is described herein for purposes of clarity by way of example and not limitation, as it should be understood that other protocols may be used. An example of input single 111 is further described below with reference to FIG. 7.

With renewed reference to FIG. 2, differential amplifier 151 in this embodiment is configured as an input threshold detector. Thus, differential amplifier 151 is configured to detect when and input signal 111 is present at input interface 101. Differential amplifier 152 in this embodiment is configured as a CML input buffer. Output of differential amplifier 152 is provided to equalizer 154. Output of equalizer 154 is provided to adder 155 for subtraction with an output of DC offset canceller 153. Output of adder 155 is provided to limiting amplifier 156.

Output of limiting amplifier is provided to DC offset canceller 153 for a previously described feedback input, as well as provided to buffer 158 and delay buffer 157. A de-emphasis control signal 169 may be provided to de-emphasis controller 168, and a swing control signal 170 may be provided to swing controller 167. Outputs of de-emphasis controller 168 and swing controller 167 may be provided as control signal inputs to delay buffer 157, buffer 158 and differential driver 160. Buffered data from input signal 111 output from either buffer 158 or delay buffer 157 may be input to differential driver 160 for output as an output signal via output interface 102.

Differential driver 160 in this exemplary embodiment is a CML output buffer. An output of differential driver 160 is coupled to receiver detector 159. Receiver detector 159 may be for checking for a load when re-driver conditioning device 200 is in a load or receiver detection mode. Outputs of differential driver 160 are respectively coupled to ends of resistors 164 and 165, and other ends of resistors 164 and 165 are respectively coupled to Vbias 163 via digital switches 188 and 189. Thus, output of differential driver 160 may be coupled for conditional pull-up to provide a low resistance state, such as approximately a 50-ohm impedance for example, or a Hi-Z state. Even though the example of 50 ohms is used, it should be understood that input and/or output termination impedance may vary from application-to-application, and thus other resistance values may be used. Differential driver 160, as previously described, may be coupled to receive output from differential amplifier 151 as a control signal 182 to terminate a detection mode in response to a threshold amount of input signal detected by differential amplifier 151.

Voltage regulator and power manager 130 may be coupled to receive a supply voltage 132 and provide a supply voltage 131, such as for providing Vbias 163 for example. Voltage regulator and power manager 130 may be activated by assertion of a chip enable ("CE") signal 133.

Re-driver conditioning device 200 may include control circuit 120 as part of control module 192 of FIG. 1. Control circuit 120 may include a state machine 121. Control circuit 120 may be configured to put re-driver conditioning device 200 into and out of a detection mode and a slumber mode.

Such detection mode may be a receiver detection mode, such as part of "receiver detect control," or such detection mode may be a load, such as a resistive load, detection mode. For purposes of clarity by way of example and not limitation, it shall be assumed that such detection mode is a receiver detection mode. Accordingly, control circuit 120 may be a slumber mode and receiver detection controller.

Control circuit may be coupled to receive a compliance test mode signal 134 and to assert or de-assert activation or enable signals 135 for other blocks of re-driver condition device 200 in accordance with the description herein. Along those lines, a receiver detection input or pin of control circuit 120 may be pulled high for example to activate an automatic receiver detection mode entry of re-driver conditioning device 200. A receiver detection loop may become active if a corresponding channel's signal detector is idle for longer than a predetermined time. Such channel may move to an unplug mode if no load is detected or may return to a low power mode, namely a slumber mode, due to inactivity.

For purposes of clarity by way of example and not limitation, it shall be assumed that a channel or other communication link has been established between a host and a peripheral via re-driver conditioning device 200. For "hot-swap" and/or "plug and play" devices, re-driver conditioning device 200 may periodically enter into a receiver detection mode via control circuit 120 to determine whether a peripheral is still coupled to receiver-side output interface 102, namely to determine whether a communication link or handshake with such peripheral is still present based on detection of a load.

Figure 3:
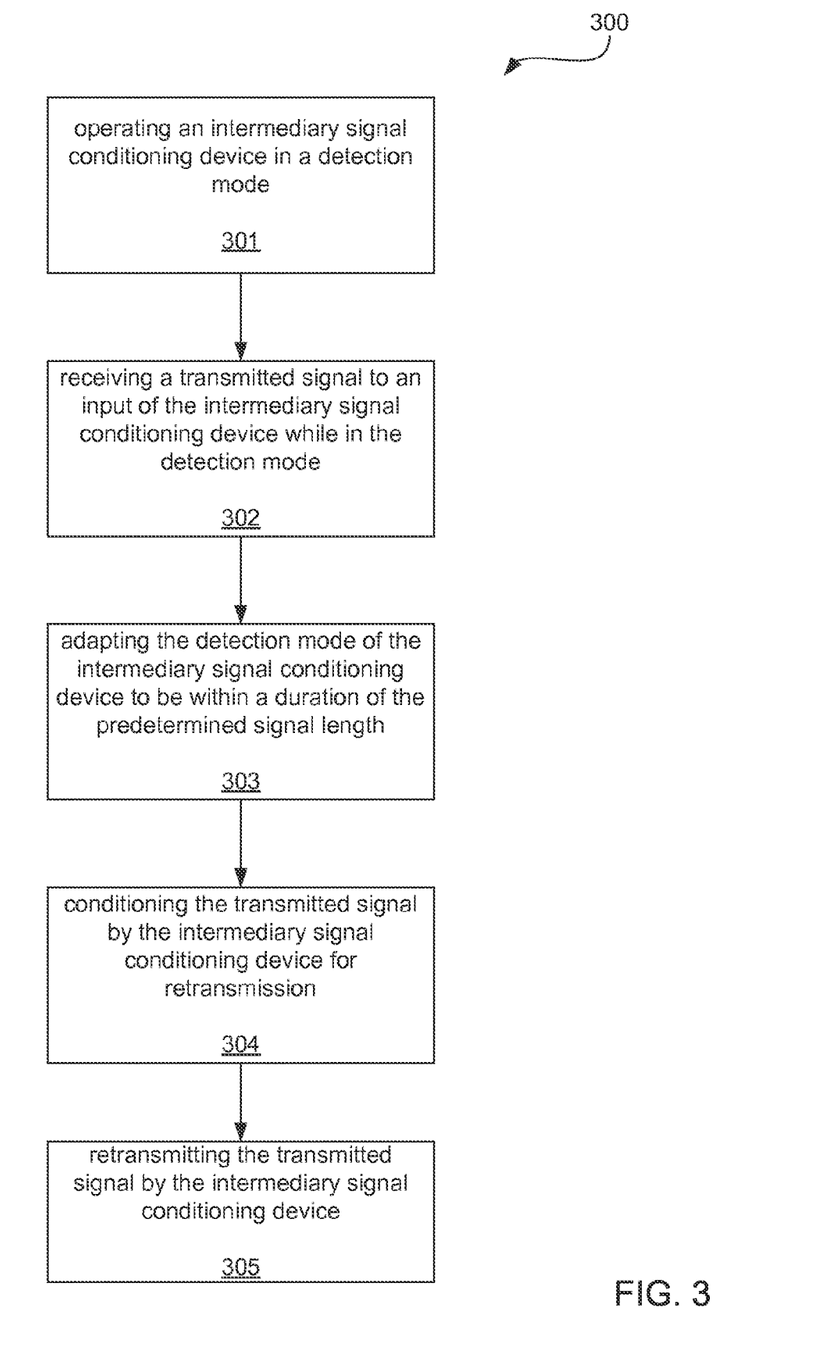
FIG. 3 is a flow diagram depicting an exemplary embodiment of an interruptible receiver detection mode process.

The above example is further described with simultaneous reference to FIGS. 2 and 3, where FIG. 3 is a flow diagram depicting an exemplary embodiment of an interruptible receiver detection mode process 300. At 301, re-driver conditioning device 200 is operating in a receiver detection mode under control of control circuit 120. For example, a host may go into an idle mode or a power saving mode, during which time such host may not transmit any signal 111. After an amount of such idle time, control circuit 120 may cause re-driver conditioning device 200 to go into a receiver detection mode or a load detection mode. For example, if after some extended period of time, for example after approximately 5 millisecond ("ms"), re-driver conditioning device 200 does not receive any transmitted signal 111, then control circuit 120 may put re-driver conditioning device 100 into a receiver detection mode. If after a receiver detection mode is completed and no load is detected as coupled to receiver-side output interface 102, then transmitter-side input interface 101 may be put into a Hi-Z state.

A host may interpret such Hi-Z state as an absence of load on an opposing end of a communication link, namely in this example the peripheral may no longer be attached. However, while a peripheral is attached, re-driver conditioning device 200 periodically verifies the continued presence of such peripheral in place of a host. In other words, if a host were directly connected to a peripheral without an intermediary signal conditioning device, then such host would employ a host receiver detection mode. Furthermore, because re-driver conditioning device 200 is in a receiver detection mode at 301 after a communication link or channel was established, re-driver conditioning device 200 may continue to persist in the existence of such communication link or channel by keeping transmitter-side input interface at approximately 50 ohms, namely in a ready to receive state, until no load is detected as a result of completion of a receiver detection mode. Thus, even though re-driver conditioning device 200 is in a receiver detection mode, re-driver conditioning device 200 is still able to receive a transmitted signal 111.

For purposes of continuing the above example, suppose re-driver conditioning device 200 is operating in a receiver detection mode and such mode takes some amount of time, for example approximately 15 microseconds (μs), to complete. Further assume that when in such receiver detection mode, at 302 a transmitted signal 111 to transmitter-side input interface 101 of re-driver conditioning device 200 is received. Furthermore, assume that duration of such receiver detection mode, namely completion of a cycle of such a mode, is longer than a predetermined signal length 110. In an embodiment, such predetermined signal length 110 may be a minimum pulse length 110 or other minimum or threshold limit for a transmitted signal 111 in accordance with the description herein.

In response to detecting presence of transmitted signal 111 on transmitter-side input interface 101, control circuit 120 may be configured to cause re-driver conditioning device 200 at 303 to interrupt a receiver detection mode, namely interrupt such receiver detection mode. Along those lines, control circuit 120 may be configured to cause re-driver conditioning device 200 to exit or suspend a receiver detection mode and enter into a retransmission mode within the duration of a predetermined pulse length 110 of transmitted signal 111. For example, predetermined pulse length 110 may be a minimum pulse length for a network protocol, as previously described. Further, for example, predetermined pulse length 110 may be a minimum pulse length for a network protocol for a transmission parameter, as previously described.

The amount of time for control circuit 120 to exit or suspend a receiver detection mode and put intermediary signal conditioning device 100 into a retransmission mode may vary from application-to-application. However, for purposes of clarity by way of example and not limitation, it shall be assumed that such transition from receiver detection mode to retransmission mode is on the order of approximately 20 nanosecond ("ns").

In a receiver detection mode, re-driver conditioning device 200 may be operating in a low power mode to conserve energy. Thus, responsive to a detected transmitted signal 111, control circuit 120 may cause re-driver conditioning device 200 to transition from such low power mode to a normal power mode for retransmission. The amount of time to perform such transition may be less than or equal to approximately 20 ns in the example, so, within a sufficiently short time, re-driver conditioning device 200 may be transitioned from a receiver detection mode to a retransmission mode to process a detected input signal from a host.

At 304, transmitted signal 111 may be conditioned by re-driver conditioning device 200 for retransmission. At 305, transmitted signal 111 may be retransmitted by re-driver conditioning device 200 via receiver-side output interface 102, as previously described herein. Again, even though the examples of 20 ns, 15 μs, 5 ms, and 50 ohms have been used for purposes of clarity by way of example, it should be understood that these or any other values may be used in accordance with the above description. Furthermore, it should be understood that an insignificant amount of transmitted signal 111 may be lost due to transitioning from a detection mode to a retransmission mode, as previously described herein.

Figure 4:
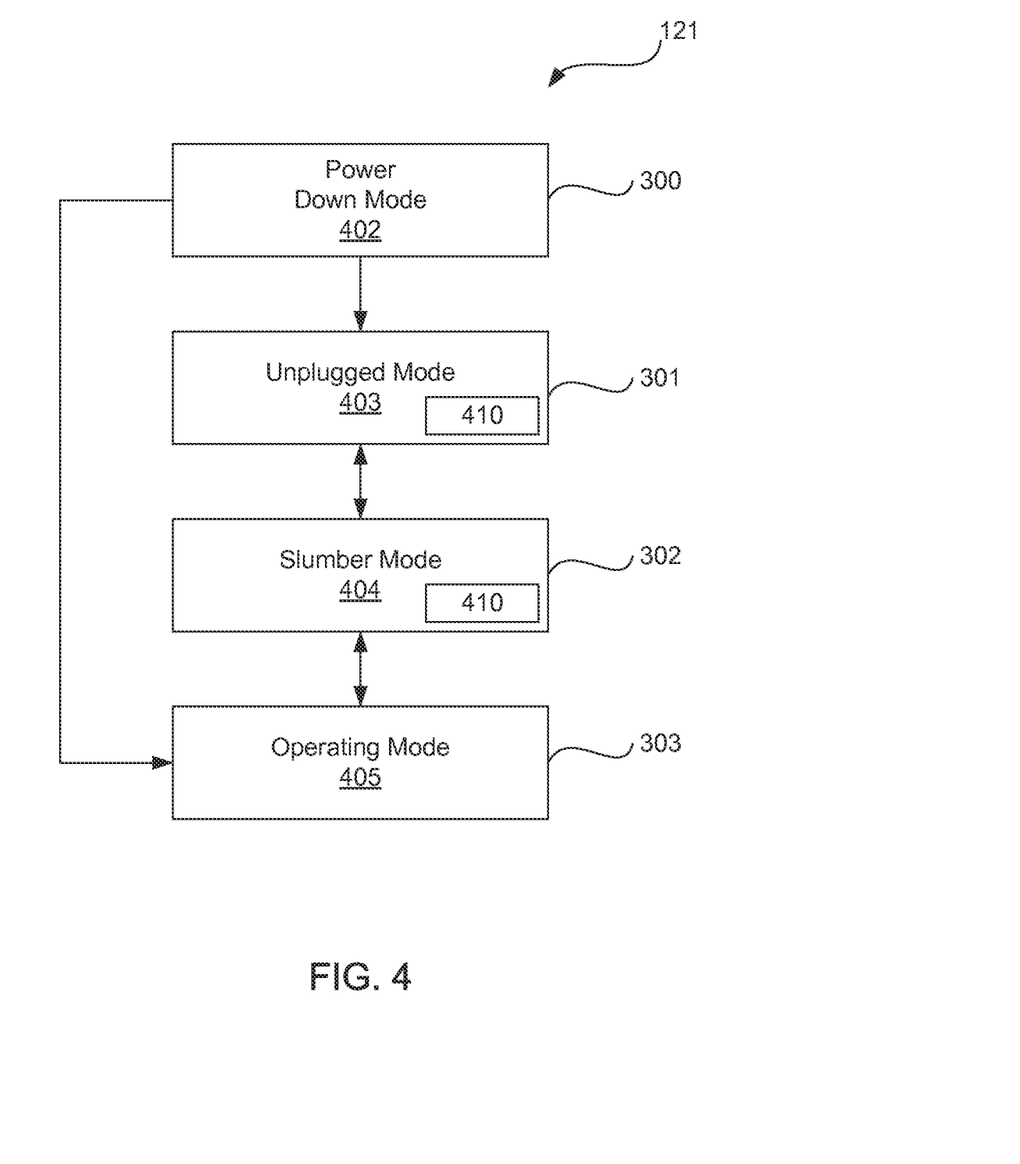
FIG. 4 is a flow diagram depicting an exemplary embodiment of a state machine.

FIG. 4 is a flow diagram depicting an exemplary embodiment of a state machine 121. In this embodiment, state machine 121 has four modes, namely a power down mode 402, an unplugged mode 403, a slumber mode 404, and an active (operating) mode 405. State machine 121 may go from power down mode 402 to unplugged mode 403 or to operating mode 405. From unplugged mode 403, state machine 121 may go to slumber mode 404, and from operating mode 405, state machine may go to slumber mode 404. From slumber mode 404, state machine 121 may go either to unplugged mode 403 or operating mode 405.

Unplugged mode 403 does not necessarily mean that a host device or other device used to send a transmission to intermediary signal conditioning device 100 of FIG. 1 is actually unplugged, as such device may be idle for a sufficient time, as previously described, so as to allow intermediary signal conditioning device 100 to enter into a receiver detection mode 410. Likewise, intermediary signal conditioning device 100 may be in a slumber mode 404 or other low power mode, and thus go into a receiver detection mode 410.

Figure 5:
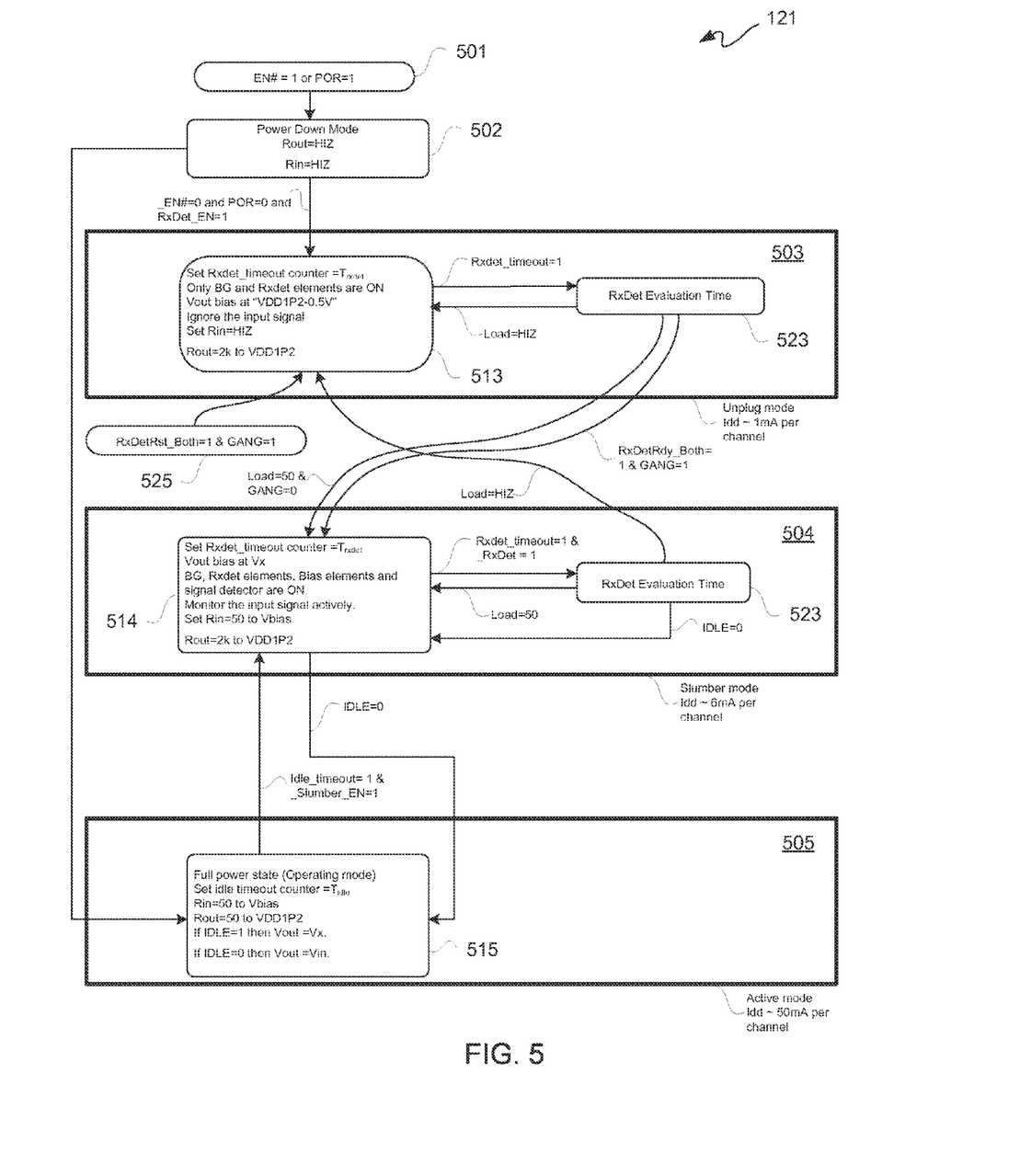
FIG. 5 is a flow diagram depicting an exemplary embodiment of the state machine of FIG. 4 for an IC chip embodiment of the re-driver conditioning device of FIG. 2.

FIG. 5 is a flow diagram depicting an exemplary embodiment of state machine 121 of FIG. 4 for an IC chip embodiment of re-driver conditioning device 200 of FIG. 2. Intermediary signal conditioning device 100 may be provided as an IC having a plurality of pinouts or pads. One such pad may be for a receive detect activation, namely an _RxDet_EN pad, which may be used to activate a receiver detection mode, namely activate a receiver terminal detection for a channel. When such _RxDet_EN pad is set to a logic low level, a channel may effectively skip use of state machine 121 for such receiver termination detection. When such _RxDet_EN pad is set to a logic high at 501, a receiver detection mode may be invoked to test a channel for presence of a load, as previously described herein. Such a receiver detection mode may be invoked by assertion of a power-on reset ("POR"), which is this embodiment is likewise a logic high, as likewise indicated at 501.

At 502, a power down mode may be invoked. If a power down mode is invoked, resistances of input and output interfaces may be set for example to Hi-Z. For example, if an enable# signal and a POR signal are both equal to logic 0 and a receiver detector enable signal is a logic 1, then at 503 an unplugged mode may be invoked. For example, if an enable# signal and a POR signal are both equal to logic 0 and a receiver detector enable signal is a logic 0, then at 505 an operating mode may be invoked.

Within operating in an unplugged mode at 503, conditions 513 may exist. Example conditions 513 are illustrated; however, these or other conditions may be used as may vary from implementation-to-implementation. From conditions 513, if a receiver detector counter times out, then a receiver detection evaluation 523 may be invoked within such an unplugged mode. Input 525, such as a receiver detection reset for example, may be used to influence one or more of conditions 513. From receiver detection evaluation 523 at 503, a return to conditions 513 or a transition to conditions 514 may occur.

Within operating in a slumber mode at 504, conditions 514 may exist. Example conditions 514 are illustrated; however, these or other conditions may be used as may vary from implementation-to-implementation. From conditions 514, if a receiver detector counter times out, then a receiver detection evaluation 523 may be invoked within such a slumber mode. During receiver detection evaluation 523, any signal that is detected by differential amplifier 151 may cause re-driver conditioning device 200 go to conditions 515 at 505 within a predetermined time, such as 20 ns for example. From receiver detection evaluation 523 at 504, a return to conditions 514 in slumber mode or a transition to conditions 513 in an unplugged mode may occur.

Within operating in an operating mode at 505, conditions 515 may exist. Example conditions 515 are illustrated; however, these or other conditions may be used as may vary from implementation-to-implementation. From conditions 515 in an operating mode, a transition to conditions 514 in a slumber mode may occur.

Figure 6:
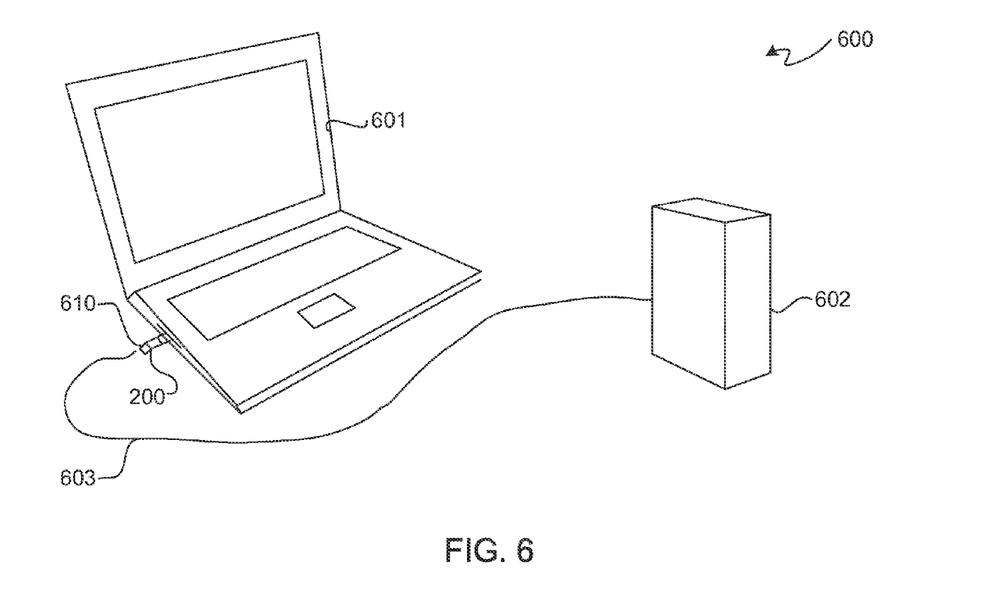
FIG. 6 is a perspective view depicting an exemplary embodiment of a system having an adapter with the re-driver conditioning device of FIG. 2.

FIG. 6 is a perspective view depicting an exemplary embodiment of a system 600. System 600 includes a peripheral 602, a host computer 601, a cable 603, and a USB adapter 610. USB adapter 610 and cable 603 are used to couple peripheral 602 and host computer 601. In this exemplary embodiment, host computer 601 is a notebook computer and peripheral 602 is an external hard drive; however, in other embodiments other types of host processing systems and other types of peripherals may be used. For example, a tablet device, a desktop computer, a workstation, or the like may be coupled to an external hard drive, a projector, a display, or the like. USB adapter 610 includes a re-driver conditioning device 200 of FIG. 2.

Figure 71:
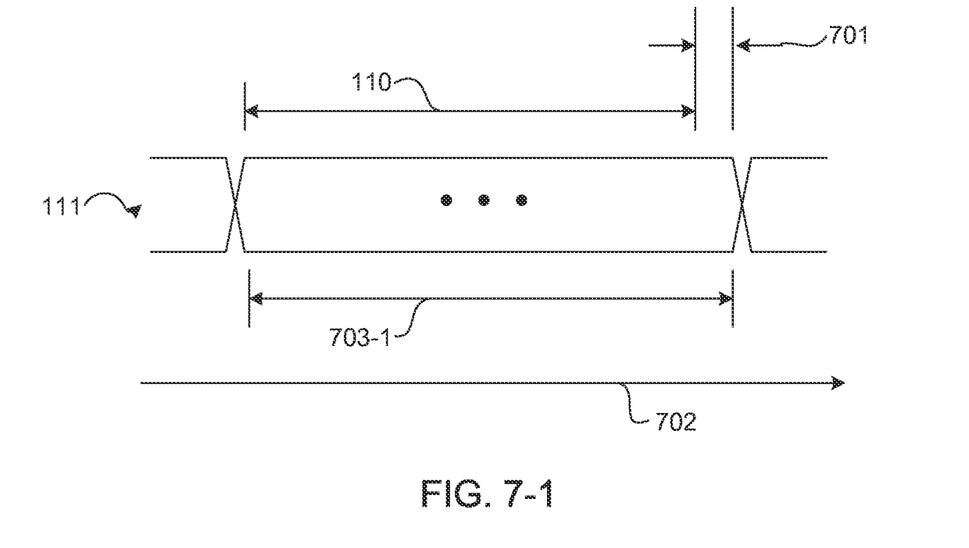
Figure 72:
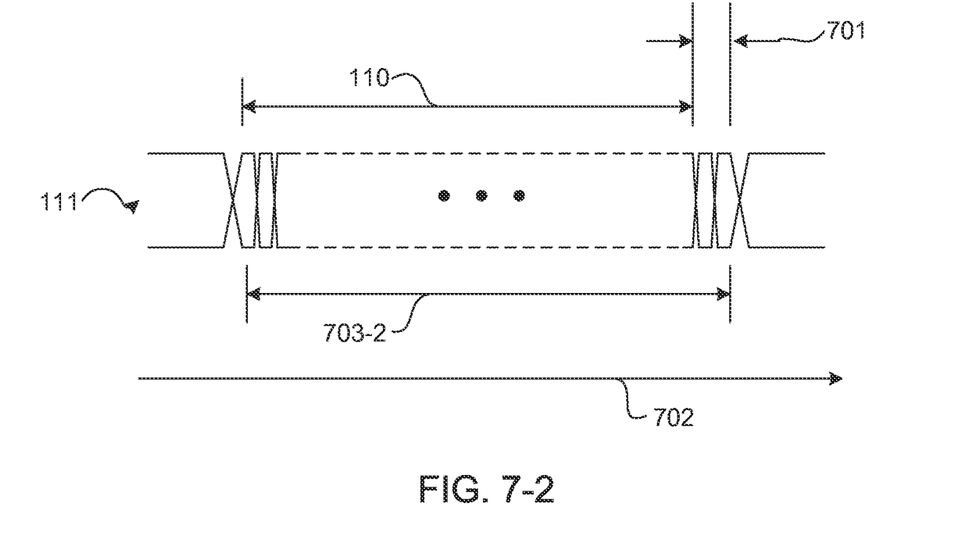

With reference to FIGS. 7-1 and FIG. 7-2, where there are shown respective signal diagrams depicting respective exemplary embodiments of a transmitted or input ("input") signal 111 respectively having a pulse width or length 703-1 and a high-speed input signal 111 with envelope length 703-2. Input signal 111 may be specified to have a minimum pulse width or length 110. Accordingly, there is a predetermined portion of pulse width or length 703-1 or envelope length 703-2 that may be lost, namely portion 701. Pulse length and envelope length are used interchangeably herein. As input signal 111 may be thought to be moving along a time axis 702, such predetermined portion may be associated with or related to an amount of time.

While the foregoing describes exemplary embodiment(s) in accordance with one or more aspects of the invention, other and further embodiment(s) in accordance with the one or more aspects of the invention may be devised without departing from the scope thereof, which is determined by the claim(s) that follow and equivalents thereof. Claim(s) listing steps do not imply any order of the steps. Trademarks are the property of their respective owners.

What is claimed is:

1. An apparatus, comprising:
an intermediary signal conditioning device having a control module, an input module, and an output module;
wherein the input module and the control module are for receiving an input signal;
wherein the control module is configured to interrupt the output module within a duration of time to allow at least a minimum pulse length of the input signal to be output as an output signal from the output module; and
wherein the intermediary signal conditioning device is configured to condition the input signal for retransmission as the output signal.

2. The apparatus according to claim 1, wherein the minimum pulse length of the input signal relates to a signal transmission parameter of a specification.

3. The apparatus according to claim 2, wherein the specification is related to a protocol selected from a group consisting of USB, PCIe, SAS, and SATA.

4. The apparatus according to claim 1, wherein the control module is configured to interrupt a detection mode of an intermediary signal conditioning device.

5. The apparatus according to claim 1, wherein the duration of time is substantially less than the minimum pulse length of an input pulse width of the input signal.

6. The apparatus according to claim 1, wherein the duration of time of the intermediary signal conditioning device is equal to or less than an allowable amount of pulse width loss of the input signal.

7. The apparatus according to claim 1, wherein the control module is coupled to interrupt the output module during a detection mode to allow the at least the minimum pulse length of the input signal to be retransmitted by the intermediary signal conditioning device as the output signal.

8. The apparatus according to claim 7, wherein the detection mode is a receiver detection mode.

9. The apparatus according to claim 7, wherein the detection mode is a load detection mode.

10. The apparatus according to claim 7, wherein:
the control module includes a first differential amplifier coupled to receive the input signal;
the input module includes a second differential amplifier coupled to receive the input signal; and
the output module includes a differential driver coupled to the first differential amplifier and the second differential amplifier.

11. An apparatus, comprising:
an intermediary signal conditioning device having a control module, an input module, and an output module;
wherein the input module and the control module are for receiving an input signal;
wherein the control module is configured to interrupt a detection mode of the intermediary signal conditioning device within a duration of time to allow at least a minimum envelope length of the input signal to be output as an output signal from the output module; and
wherein the intermediary signal conditioning device is configured to condition the input signal for retransmission as the output signal.

12. A method for retransmission, comprising:
operating an intermediary signal conditioning device in a detection mode;
receiving a transmitted signal to an input module and a control module of the intermediary signal conditioning device while in the detection mode;
responding to receipt of the transmitted signal by having the intermediary signal conditioning device switch from the detection mode to a retransmission mode within a duration of time sufficient to allow at least a minimum pulse length of the transmitted signal to be processed as an input signal for retransmission as an output signal;
conditioning the input signal by the intermediary signal conditioning device for retransmission; and
retransmitting the input signal as an output signal via an output module of the intermediary signal conditioning device.

13. The method according to claim 12, wherein the responding includes interrupting the detection mode.

14. The method according to claim 13, wherein the minimum pulse length is associated with a signal transmission parameter of a specification.

15. The method according to claim 14, wherein the specification includes a protocol selected from a group consisting of USB, PCIe, SAS, and SATA.

16. The method according to claim 14, wherein the duration of time is substantially less than the minimum pulse length of an input pulse width of the transmitted signal.

17. The method according to claim 14, wherein the duration of time is equal to or less than an allowable amount of pulse width loss of the transmitted signal.

18. The method according to claim 14, wherein the control module is coupled to interrupt the output module during the detection mode to allow the at least the minimum pulse length of the input signal to be retransmitted by the intermediary signal conditioning device as the output signal.

19. The method according to claim 14, wherein the detection mode is a receiver detection mode.

20. The apparatus according to claim 14, wherein the detection mode is a load detection mode.

* * * * *